US012109605B2

(12) United States Patent
Yamakawa et al.

(10) Patent No.: US 12,109,605 B2
(45) Date of Patent: Oct. 8, 2024

(54) BEAD FORMING METHOD AND STRUCTURAL MEMBER

(71) Applicant: Kobe Steel, Ltd., Kobe (JP)

(72) Inventors: Taiki Yamakawa, Kobe (JP); Toru Hashimura, Kobe (JP); Yasuhiro Maeda, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 683 days.

(21) Appl. No.: 17/289,149

(22) PCT Filed: Oct. 10, 2019

(86) PCT No.: PCT/JP2019/040042
§ 371 (c)(1),
(2) Date: Apr. 27, 2021

(87) PCT Pub. No.: WO2020/100483
PCT Pub. Date: May 22, 2020

(65) Prior Publication Data
US 2021/0379643 A1 Dec. 9, 2021

(30) Foreign Application Priority Data
Nov. 14, 2018 (JP) ................................. 2018-213881

(51) Int. Cl.
*B21D 39/04* (2006.01)
*B21D 39/20* (2006.01)
(Continued)

(52) U.S. Cl.
CPC ........... *B21D 39/044* (2013.01); *B21D 39/20* (2013.01); *B21D 41/02* (2013.01); *B21D 53/88* (2013.01); *B60R 19/24* (2013.01)

(58) Field of Classification Search
CPC ...... B60R 19/24; B21D 22/10; B21D 22/105; B21D 22/125; B21D 41/02; B21D 41/028;
(Continued)

(56) References Cited

U.S. PATENT DOCUMENTS

2012/0267908 A1\* 10/2012 Kokubo ............... B21D 39/044
293/133
2018/0015527 A1 1/2018 Maeda et al.
(Continued)

FOREIGN PATENT DOCUMENTS

JP 2004-189063 A 7/2004
JP 2004-203202 A 7/2004
(Continued)

OTHER PUBLICATIONS

International Preliminary Report on Patentability and Written Opinion issued May 27, 2021 in PCT/JP2019/040042 (with English translation), 14 pages.
(Continued)

*Primary Examiner* — Debra M Sullivan
*Assistant Examiner* — Matthew Stephens
(74) *Attorney, Agent, or Firm* — Oblon, McClelland, Maier & Neustadt, L.L.P.

(57) ABSTRACT

A bead forming method includes the steps of preparing a bumper stay having a partition wall that partitions an internal space and extends in a longitudinal direction, an elastic body that can be inserted into the bumper stay, and a pusher that presses the elastic body; inserting the elastic body into the bumper stay and arranging the elastic body in the bumper stay so as not to come into contact with the partition wall; and forming a buckling bead by compressing the elastic body in the longitudinal direction of the bumper stay by the pusher to expand the elastic body outward in a radial
(Continued)

direction without coming into contact with the partition wall, thereby bulging a part of an outer wall of the bumper stay outward in the radial direction without deforming the partition wall.

12 Claims, 11 Drawing Sheets

(51) Int. Cl.
  *B21D 41/02* (2006.01)
  *B21D 53/88* (2006.01)
  *B60R 19/24* (2006.01)
(58) Field of Classification Search
  CPC ...... B21D 41/026; B21D 53/88; B21D 39/20; B21D 39/203; B21D 39/206
  See application file for complete search history.

(56) References Cited

U.S. PATENT DOCUMENTS

| | | |
|---|---|---|
| 2019/0210088 A1 | 7/2019 | Maeda et al. |
| 2019/0210089 A1 | 7/2019 | Maeda et al. |
| 2019/0375355 A1 | 12/2019 | Maeda et al. |

FOREIGN PATENT DOCUMENTS

| | | | | |
|---|---|---|---|---|
| JP | 2011-84110 A | | 4/2011 | |
| JP | 2011084110 A | * | 4/2011 | ............. B21D 39/06 |
| JP | 2016147309 A | * | 8/2016 | ............ B21D 39/032 |
| JP | 2017064728 A | * | 4/2017 | ............. B21D 19/08 |
| JP | 2017064772 A | * | 4/2017 | ............. B21D 39/06 |
| JP | 2018-153860 A | | 10/2018 | |
| WO | WO 2011/049029 A1 | | 4/2011 | |
| WO | WO 2016/125507 A1 | | 8/2016 | |
| WO | WO 2017/056899 A1 | | 4/2017 | |
| WO | WO 2018/131512 A1 | | 7/2018 | |
| WO | WO 2018/168841 A1 | | 9/2018 | |
| WO | WO 2018/180489 A1 | | 10/2018 | |

OTHER PUBLICATIONS

International Search Report issued on Dec. 3, 2019 in PCT/JP2019/040042 filed on Oct. 10, 2019, 2 pages.

Extended European Search Report issued Jun. 30, 2022 in European Patent Application No. 19883566.2, 7 pages.

* cited by examiner

BEAD FORMING METHOD AND STRUCTURAL MEMBER

CROSS-REFERENCE TO RELATED APPLICATIONS

This is a national phase application in the United States of International Patent Application No. PCT/JP2019/040042 with an international filing date of Oct. 10, 2019, which claims priority of Japanese Patent Application No. 2018-213881 filed on Nov. 14, 2018 the contents of which are incorporated herein by reference.

TECHNICAL FIELD

The present invention relates to a bead forming method and a structural member.

BACKGROUND ART

Structural members with various shapes are used in vehicles. For example, a bumper stay or front side member, which is one of the structural members of a vehicle, has a shape of pipe body. These pipe bodies are processed into various shapes according to a required strength and joining mode. Electromagnetic forming is an example of such a processing method.

Electromagnetic forming is a method in which a conductive coil is inserted inside the pipe body and a diameter of the pipe body is expanded or bulged by the electromagnetic force generated when the coil is energized. For example, JP 2004-189063 A and JP 2011-84110 A disclose a method of forming a deformed portion by bulging an outer surface of a pipe body by electromagnetic forming. Such a deformed portion is called a buckling bead, which serves as a starting point of crushing and suppresses a peak of the initial maximum load generated at the time of collision. By suppressing the peak of the initial maximum load generated at the time of collision, an efficiency to absorb collision energy can be increased.

Patent Document 1: JP 2004-189063 A
Patent Document 2: JP 2011-84110 A

SUMMARY OF THE INVENTION

However, electromagnetic forming is expensive because dedicated equipment and replacement of coils are required. Further, in electromagnetic forming, an entire outer wall of a pipe body into which a conductive coil is inserted is deformed in the circumferential direction. Therefore, in order to deform only a specific part in the circumferential direction, a jig for restricting deformation of a part other than the specific part is required. Furthermore, when the pipe body has a partition wall that partitions an internal space, not only the outer wall but also the partition wall may be unintentionally deformed. These problems can occur not only in electromagnetic forming but also in hydroforming which is a similar technique.

It is therefore an object of the present invention, in a bead forming method and a structural member, to form a buckling bead without deforming a partition wall at a desired position on an outer wall of a pipe body having the partition wall.

A first aspect of the present invention provides a bead forming method, the method including: preparing a pipe body having a partition wall, an elastic body that can be inserted into the pipe body, and a pusher that presses the elastic body; inserting the elastic body into the pipe body and arranging the elastic body in the pipe body so as not to come into contact with the partition wall; and forming a buckling bead by compressing the elastic body in a longitudinal direction of the pipe body by the pusher to expand the elastic body outward in a radial direction without coming into contact with the partition wall, so as to bulge a part of an outer wall of the pipe body outward in the radial direction without deforming the partition wall.

According to this method, the buckling bead can be formed at a desired position on the outer wall of the pipe body without deforming the partition wall. In this method, unlike other methods such as electromagnetic forming or hydroforming, a part to be deformed can be arbitrarily selected by simply defining the arrangement of the elastic body. Further, since the elastic body does not come into contact with the partition wall inside the pipe body, it is possible to prevent the partition wall, which requires to maintain the shape, from being unintentionally deformed. As a result, the buckling bead can be formed at an arbitrary position on the outer wall of the pipe body while maintaining the shape of the partition wall inside the pipe body. Thus, a load capacity and the crushing direction of the pipe body can be suitably adjusted.

The pipe body includes two sets of opposing outer walls. An internal space of the pipe body may be partitioned into two or three rooms by connecting the opposing outer walls with one or two of the partition walls.

According to this method, in the pipe body having the above shape, which is often used as a structural member of a vehicle or the like, the buckling bead can be formed at a desired position other than the entire circumference of the outer wall without deforming the partition wall.

A core that protects the partition wall is further prepared. The core may be inserted together with the elastic body into the pipe body and interposed between the elastic body and the partition wall so that the elastic body does not come into contact with the partition wall.

According to this method, by protecting the partition wall with the core, the partition wall does not receive a force from the elastic body, and the deformation of the partition wall can be prevented more reliably.

The pusher has a shape corresponding to the core, and the pusher may compress only the elastic body without interfering with the core.

According to this method, since the pusher has the shape corresponding to the core, the pusher can accurately press only the elastic body, even when the pusher and the core are used at the same time.

The core includes a pedestal portion having a receiving surface corresponding to a pressing surface of the pusher, and a columnar portion rising from the pedestal portion. The columnar portion is arranged adjacent to the partition wall inside the pipe body. The elastic body is arranged between the receiving surface of the pedestal portion and the pressing surface of the pusher in the pipe body. The partition wall may be protected by the columnar portion, and also the pedestal portion and the pusher may compress the elastic body.

According to this method, the core can be used not only as a protective member for the partition wall but also as a member for pressing the elastic body.

A wall surface body having a hole through which the pipe body can be inserted is further prepared. The pipe body is inserted into the hole of the wall surface body. At the same time as the buckling bead is formed, a portion of the pipe body inserted into the wall surface body may be expanded to join the pipe body and the wall surface body by press-fitting.

According to this method, the pipe body and the wall surface body can be joined by press-fitting at the same time as the buckling bead is formed on the pipe body. Therefore, it is not necessary to separate the step of forming the buckling bead and the step of joining by press-fitting. Thus, the manufacturing time and the manufacturing cost can be reduced.

The pipe body may be a front side member or a bumper stay in vehicle structural members.

According to this method, the structural members that require special crushing characteristics in a vehicle, such as the front side member or bumper stay, can be easily manufactured. In particular, these members are required to serve as collision energy absorbing members at the time of front collision of a vehicle, and the crushing characteristics are required to be accurately adjusted. Therefore, the above method capable of forming the buckling bead at a desired position is effective for these structural members.

A second aspect of the present invention provides a structural member that includes an outer wall that defines an internal space, a flat partition wall that partitions the internal space and extends in a longitudinal direction, and a buckling bead formed by bulging a part of the outer wall.

According to this configuration, since the partition wall is flat, the pipe body is reinforced by the partition wall, and a load capacity can be secured. Further, since the buckling bead is formed on a part of the outer wall, a strength of only the part where the buckling bead is formed is reduced, and a crushing direction can be defined. Thus, the structural member can have desired crushing characteristics with adjusted load capacity and crushing direction.

According to the present invention, in a bead forming method and a structural member, a buckling bead can be formed at a desired position on an outer wall of a pipe body having a partition wall without deforming the partition wall.

MODE FOR CARRYING OUT THE INVENTION

Hereinafter, embodiments of the present invention will be described with reference to the accompanying drawings. The present embodiment relates to a pipe body as a structural member on which a buckling bead is formed, and a method of forming the buckling bead on the pipe body. In the following, a bumper system 1 (see FIG. 1) attached to the front of a vehicle will be described as an example of applications. The bumper system 1 is a member that protects a vehicle body from a front impact.

Figure 1:
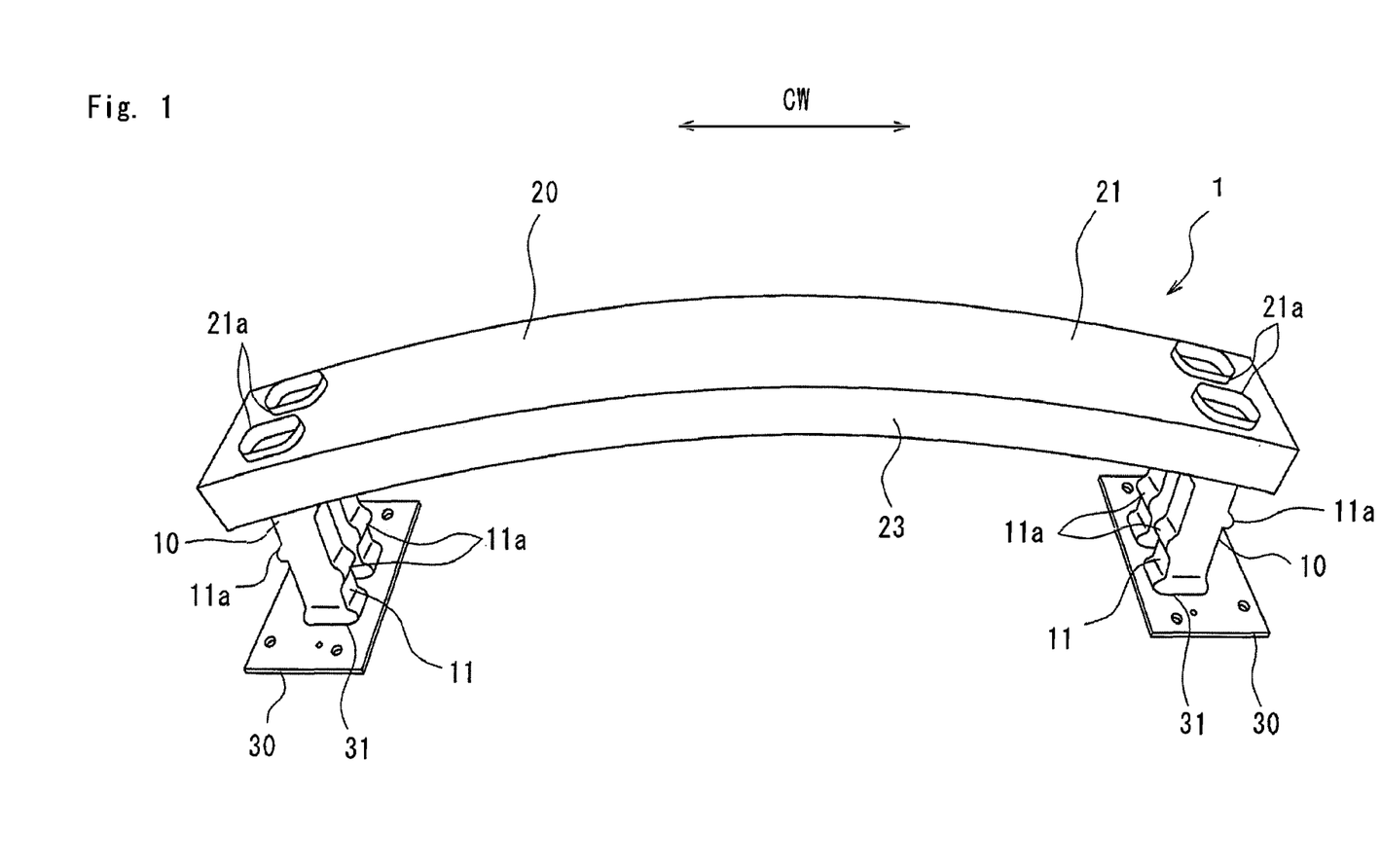
FIG. 1 is a perspective view showing a bumper system including a bumper stay according to an embodiment of the present invention.

The bumper system 1 includes a bumper stay (pipe body) 10, a bumper beam (wall surface body) 20, and a vehicle body plate (wall surface body) 30. In particular, a buckling bead 11a is formed on the bumper stay 10, and a load capacity and a crushing direction are suitably adjusted by the buckling bead 11a. Further, the bumper stay 10 and the bumper beam 20 are joined by press-fitting. Similarly, the bumper stay 10 and the vehicle body plate 30 are also joined by press-fitting.

(Structure of Each Member)

Figure 2:
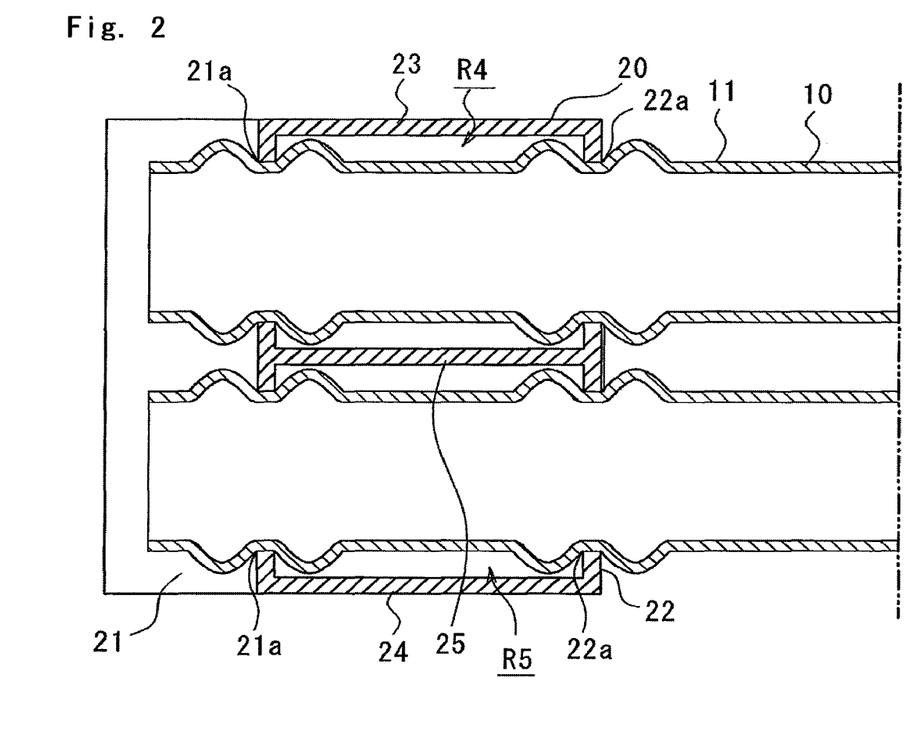
FIG. 2 is a cross-sectional view showing a joint state of the bumper stay and a bumper beam.

The bumper stay 10 is a pipe-like member that connects the bumper beam 20 and the vehicle body plate 30, which will be described later. As shown in FIG. 2, the bumper stay 10 is expanded, and the bumper stay 10 and the bumper beam 20 are joined by press-fitting. Further, although details are not shown, the bumper stay 10 and the vehicle body plate 30 are also joined by press-fitting. The bumper stay 10 may be an extruded material made of, for example, an aluminum alloy.

Figure 3:
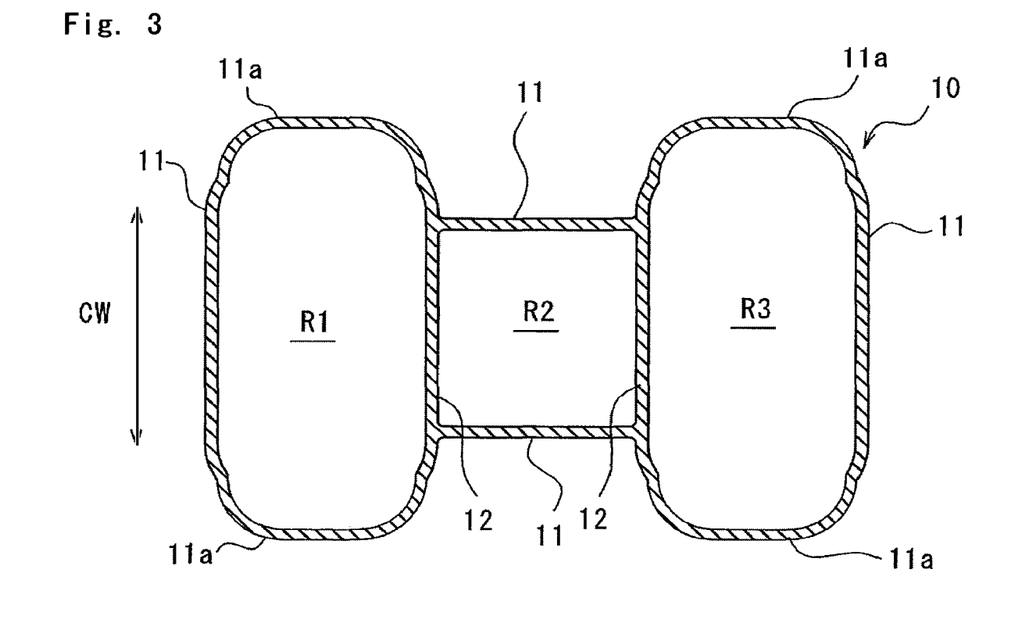
FIG. 3 is a cross-sectional view of a buckling bead portion of the bumper stay.

With reference to FIG. 3, in a plan view, the bumper stay 10 has a plurality of opposing outer walls 11, and an internal space is defined by the outer walls 11. The internal space of the bumper stay 10 is divided into three rooms R1 to R3 by two partition walls 12 connecting the opposing outer walls 11. The two partition walls 12 extend in the longitudinal direction of the bumper stay 10 and are arranged in parallel. Of the three rooms R1 to R3, two outer rooms R1 and R3 have the same shape, and a central room R2 is smaller than the two outer rooms R1 and R3. The central room R2 has a particularly short length in a car width direction CW. In other words, a shape of the bumper stay 10 in the plan view is roughly a spectacle shape narrowed in the central room R2.

With reference to FIGS. 1 and 3, the buckling bead 11a is formed on the outer wall 11 on the inner side and the outer wall 11 on the outer side in a car width direction CW of the outer walls 11 constituting the two outer rooms R1 and R3 of the bumper stay 10.

The buckling bead 11a is formed by bulging a part of the outer wall 11 of the bumper stay 10 outward in the radial direction. Since the buckling bead 11a extends in a direction intersecting the longitudinal direction of the bumper stay 10, the buckling bead 11a plays a role of reducing the load capacity of the bumper stay 10 in the longitudinal direction. Therefore, the buckling bead 11a serves as a starting point of crushing at the time of front collision of a vehicle and plays a role of suppressing peak of the initial maximum load generated in the collision.

With reference to FIGS. 1 and 2, the bumper beam 20 is a member curved in an arch, and substantially extends in the car width direction CW. The bumper beam 20 includes a front wall 21 on the front side of the vehicle, a rear wall 22 on the rear side facing the front wall 21, and a horizontal upper wall 23 and lower wall 24 vertically connecting the front wall 21 and the rear wall 22. The front wall 21 and the rear wall 22 have holes 21a and 22a through which the bumper stay 10 passes through at both ends in the car width direction CW, respectively. The bumper beam 20 includes a partition wall 25 extending in the car width direction CW between and parallel to the upper wall 23 and the lower wall 24. An internal space of the bumper beam 20 is divided into two rooms R4 and R5 by the partition wall 25.

With reference to FIG. 2, the bumper stay 10 enters each of the rooms R4 and R5 through the hole 22a in the rear wall 22, and the bumper stay 10 exits from each room R4 and R5 through the hole 21a in the front wall 21. The bumper beam 20 may be an extruded material made of, for example, an aluminum alloy.

With reference to FIG. 1, the vehicle body plate 30 is a plate-like member that is a part of a vehicle body (not shown). A hole 31 is provided in the vehicle body plate 30, and the bumper stay 10 is inserted into the hole 31. The vehicle body plate 30 may be, for example, a steel plate.

(Buckling Bead Forming Method)

Figure 4:
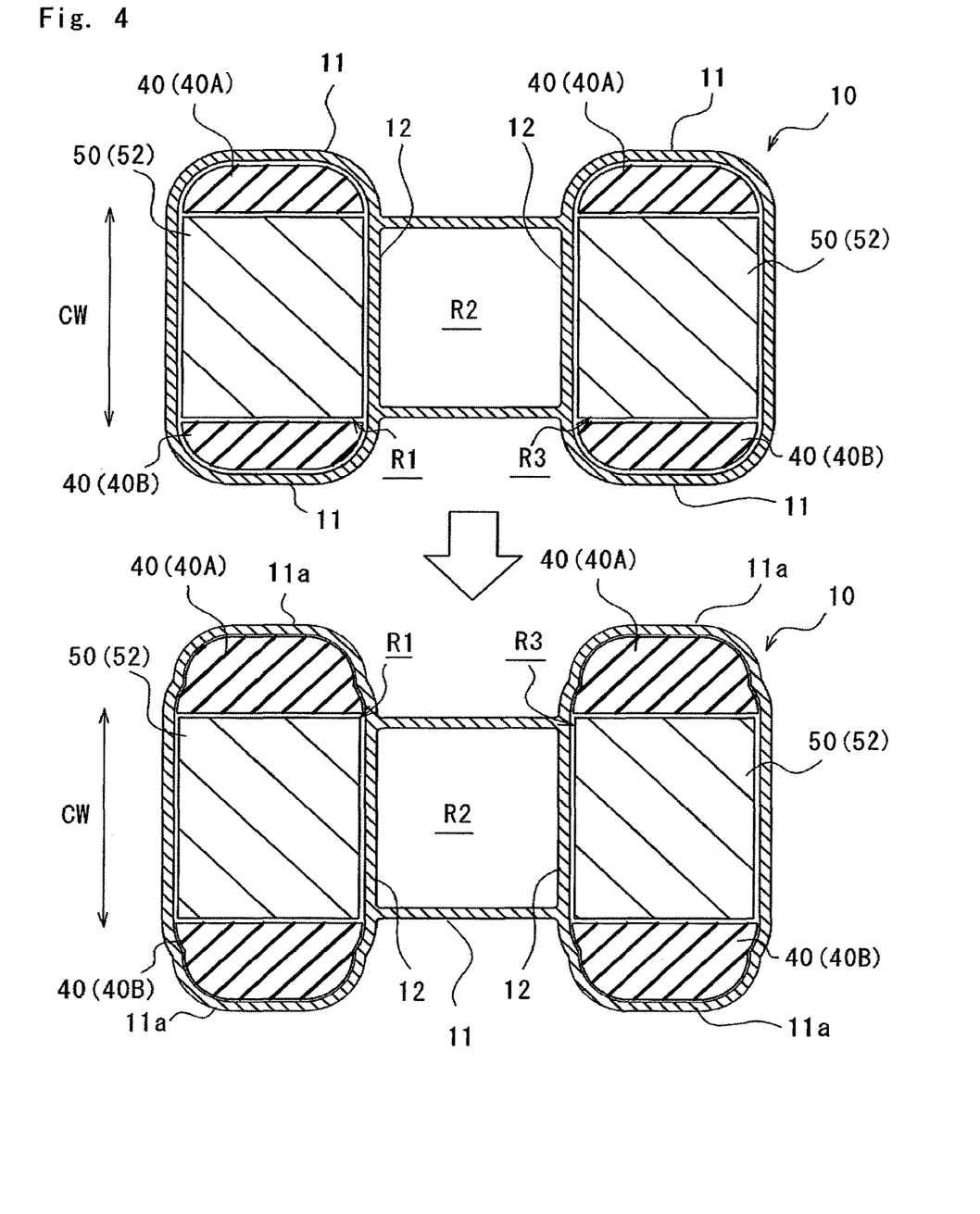
FIG. 4 is a cross-sectional view of the bumper stay before and after deformation by rubber bulging.
Figure 5:
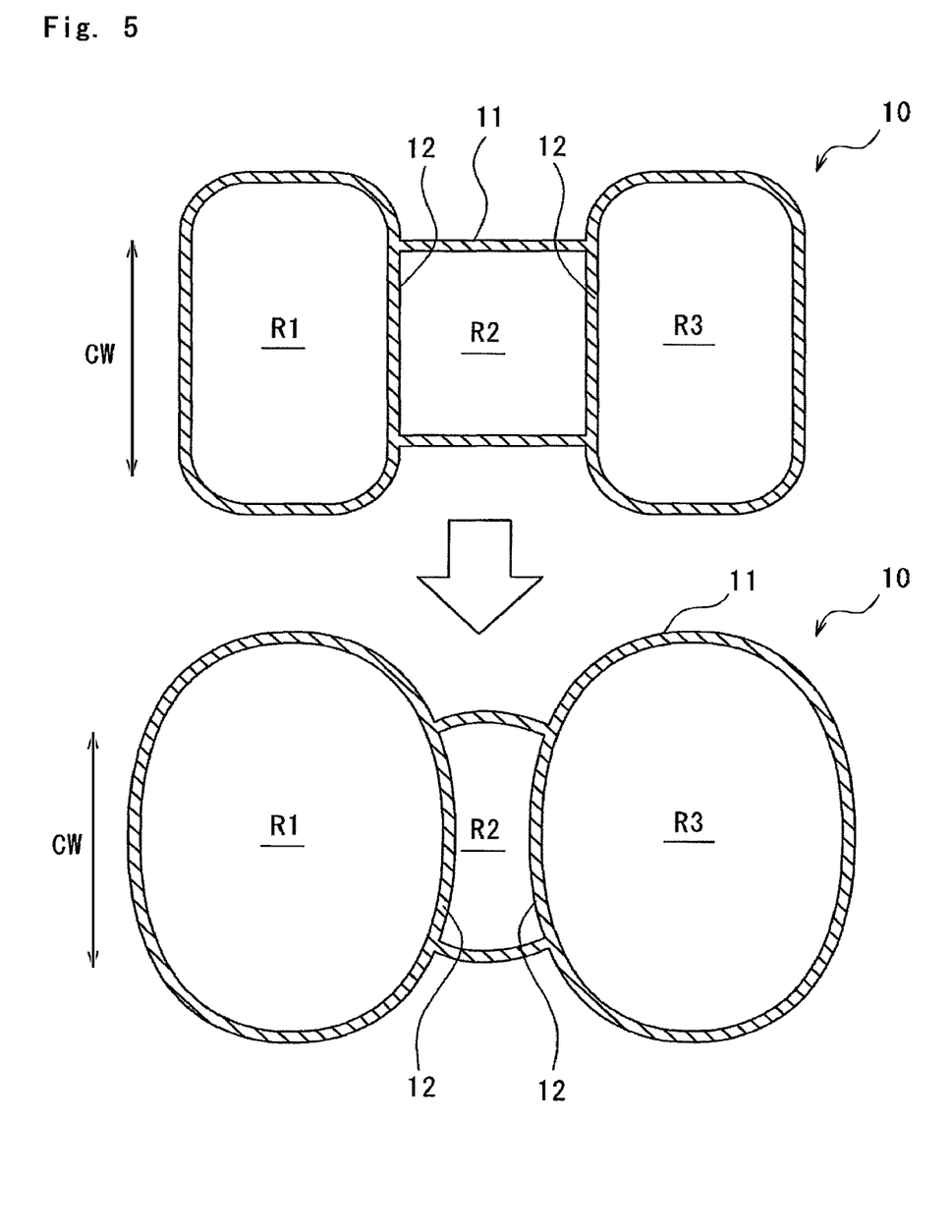
FIG. 5 is a cross-sectional view of the bumper stay before and after deformation by electromagnetic forming.

In the present embodiment, the buckling bead 11a is formed on the outer wall 11 of the bumper stay 10 by rubber bulging. With reference to FIGS. 4 and 5, a method of forming the buckling bead 11a in the present embodiment will be described by comparing rubber bulging and electromagnetic forming.

An upper drawing in FIG. 4 is a cross-sectional view of the bumper stay 10 before deformation by rubber bulging, and a lower drawing in FIG. 4 is a cross-sectional view of the bumper stay 10 after deformation by rubber bulging. In rubber bulging, an elastic body 40 is arranged in a part to be deformed. Further, a core 50 is arranged in a part not to be deformed so that the elastic body 40 does not come into contact with that part. For example, in the illustrated example, the outer wall 11 on the inner side and the outer side of the bumper stay 10 in the car width direction CW is the part to be deformed, and other part (particularly the partition wall 12) is not deformed.

The elastic body 40 is a columnar rubber member that can be inserted into the bumper stay 10. The elastic body 40 has a substantially semicircular shape to match the shape of the outer wall 11 on the inner side and the outer side of the bumper stay 10 in the car width direction CW. A material of the elastic body 40 may be, for example, urethane rubber, chloroprene rubber, chloroprene rubber+nitrile rubber (CNR rubber), silicon rubber, or the like.

The core 50 is a square columnar hard member that can be inserted into the bumper stay 10. Here, the hard member means a member having hardness enough not to be deformed by the force received from the elastic body 40. The core 50 is arranged at the center of the bumper stay 10 in the car width direction CW to restrict the movement of the elastic body 40. Specifically, the core 50 is sandwiched between the two elastic bodies 40 in the car width direction CW and is arranged adjacent to the partition wall 12. Therefore, the core 50 is arranged so as to be interposed between the elastic body 40 and the partition wall 12 so as not to make the elastic body 40 come into contact with the partition wall 12.

When the elastic body 40 is compressed in the longitudinal direction of the bumper stay 10, the elastic body 40 expands radially outward of the bumper stay 10. The buckling bead 11a can be formed by bulging the bumper stay 10 radially outward with the expanded elastic body 40. Since the partition wall 12 is protected by the core 50, the partition wall 12 does not receive a force from the elastic body 40 and does not deform. When the compressive force in the longitudinal direction is released, the elastic body 40 restores its original shape by its own elastic force. Therefore, the elastic body 40 can be easily removed from the bumper stay 10 together with the core 50.

An upper drawing in FIG. 5 is a cross-sectional view of the bumper stay 10 before deformation by electromagnetic forming, and a lower drawing in FIG. 5 is a cross-sectional view of the bumper stay 10 after deformation by electromagnetic forming. In electromagnetic forming, it is difficult to deform an arbitrary part of the bumper stay 10. In electromagnetic forming, conductive coils (not shown) are arranged in each of the rooms R1 to R3 of the bumper stay 10, and the bumper stay 10 is expanded by electromagnetic force. Therefore, the entire circumference of the conductive coil expands, and the partition wall 12 also deforms at the same time. Further, since the conductive coil requires a diameter of a certain size or more, electromagnetic forming cannot be performed when the rooms R1 to R3 are small. Therefore, it is not usually performed to narrow an insertable area of the conductive coil by arranging the core 50 (see FIG. 4) in the rooms R1 to R3 as in above-described rubber bulging. Furthermore, the core 50 itself may be joined with the bumper stay 10 and cannot be removed. Further, in general, electromagnetic forming targets a member with a circular cross section. Therefore, it is difficult to apply electromagnetic forming to a member with a rectangular cross section as illustrated.

In the present embodiment, since the rubber bulging is adopted as shown in FIG. 4, the buckling bead 11a can be formed at the desired position of the outer wall 11 of the bumper stay 10 having the partition wall 12 without deforming the partition wall 12. In the rubber bulging, unlike other methods such as electromagnetic forming or hydroforming, a part to be deformed can be arbitrarily selected by simply defining the arrangement of the elastic body 40. The arrangement of the elastic body 40 does not necessarily require the core 50, and any method capable of defining the arrangement of the elastic body 40 can be adopted. In this way, since the elastic body 40 does not come into contact with the partition wall 12 in the bumper stay 10, it is possible to prevent the partition wall 12, which requires to maintain the shape, from being unintentionally deformed. As a result, the buckling bead 11a can be formed at an arbitrary position on the outer wall 11 of the bumper stay 10 while maintaining the shape of the partition wall 12 inside the bumper stay 10. Thus, the load capacity and the crushing direction of the bumper stay 10 can be suitably adjusted.

Further, in the so-called spectacle-shaped bumper stay 10 that can be used as a structural member of a vehicle, the buckling bead 11a can be formed at a desired position other than the entire circumference of the outer wall 11 without deforming the partition wall 12. Further, the application of the buckling bead forming method of the present embodiment is not limited to the bumper stay, but may be, for example, a front side member.

Further, the use of the core 50 as shown in FIG. 4 enables to reliably protect the partition wall 12 by the core 50. Therefore, the partition wall 12 does not receive a force from the elastic body 40, and the deformation of the partition wall 12 can be prevented more reliably.

(Buckling Bead Forming Method with Joining By Press-Fitting)

Preferably, the above-described rubber bulging is used to perform joining by press-fitting at the same time as the buckling bead 11a is formed. The method will be described separately from the first to sixth steps. The case of joining the bumper stay 10 and the rear wall 22 of the bumper beam 20 will be described as an example of joining by press-fitting, but joining by press-fitting in other parts can be performed in the same manner.

Figure 6:
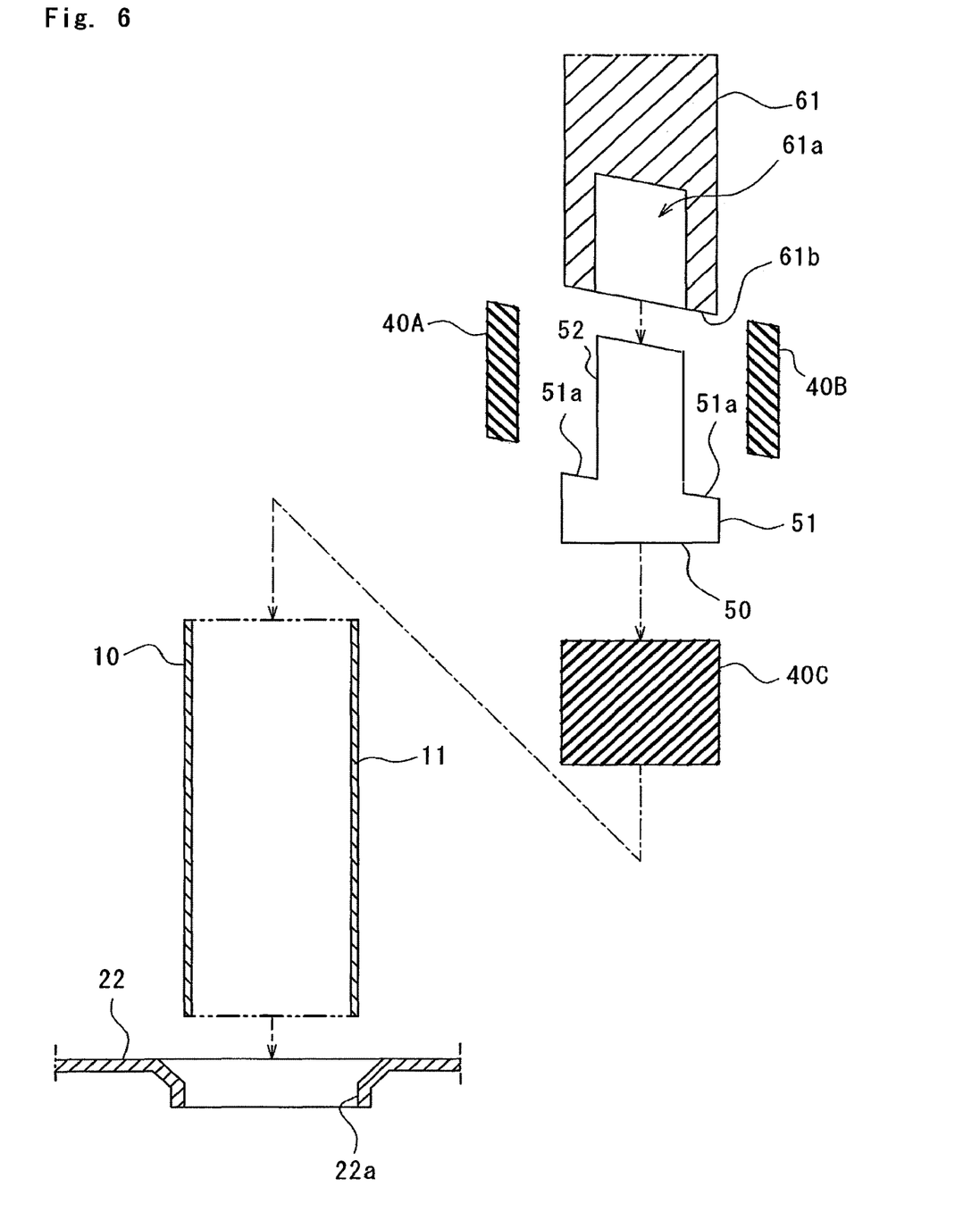
FIG. 6 is a cross-sectional view showing a first step of a bead forming method with joining by press-fitting.

With reference to FIG. 6, in the first step, the bumper stay 10, the bumper beam 20, three elastic bodies 40A to 40C (also simply referred to as the elastic body 40), the core 50, and a pusher 61 described later are prepared. At this point, the buckling bead 11a is not yet formed on the bumper stay 10, and pipe expansion and deformation is also not yet performed. That is, the outer wall 11 of the bumper stay 10 has a flat surface.

The core 50 includes a pedestal portion 51 having a receiving surface 51a corresponding to a pressing surface 61b of the pusher 61, which will be described later, and a square columnar portion 52 rising from the pedestal portion 51. The pedestal portion 51 is a portion that presses the elastic body 40 together with the pusher 61 described later. The columnar portion 52 is a portion that protects the partition wall 12 (see FIG. 4). Although not shown in detail, the pedestal portion 51 has the same outer shape as an inner shape of the rooms R1 and R3 (see FIG. 4) of the bumper stay 10. In other words, the pedestal portion 51 is filled in the rooms R1 and R3 of the bumper stay 10 with almost no gap.

Figure 7:
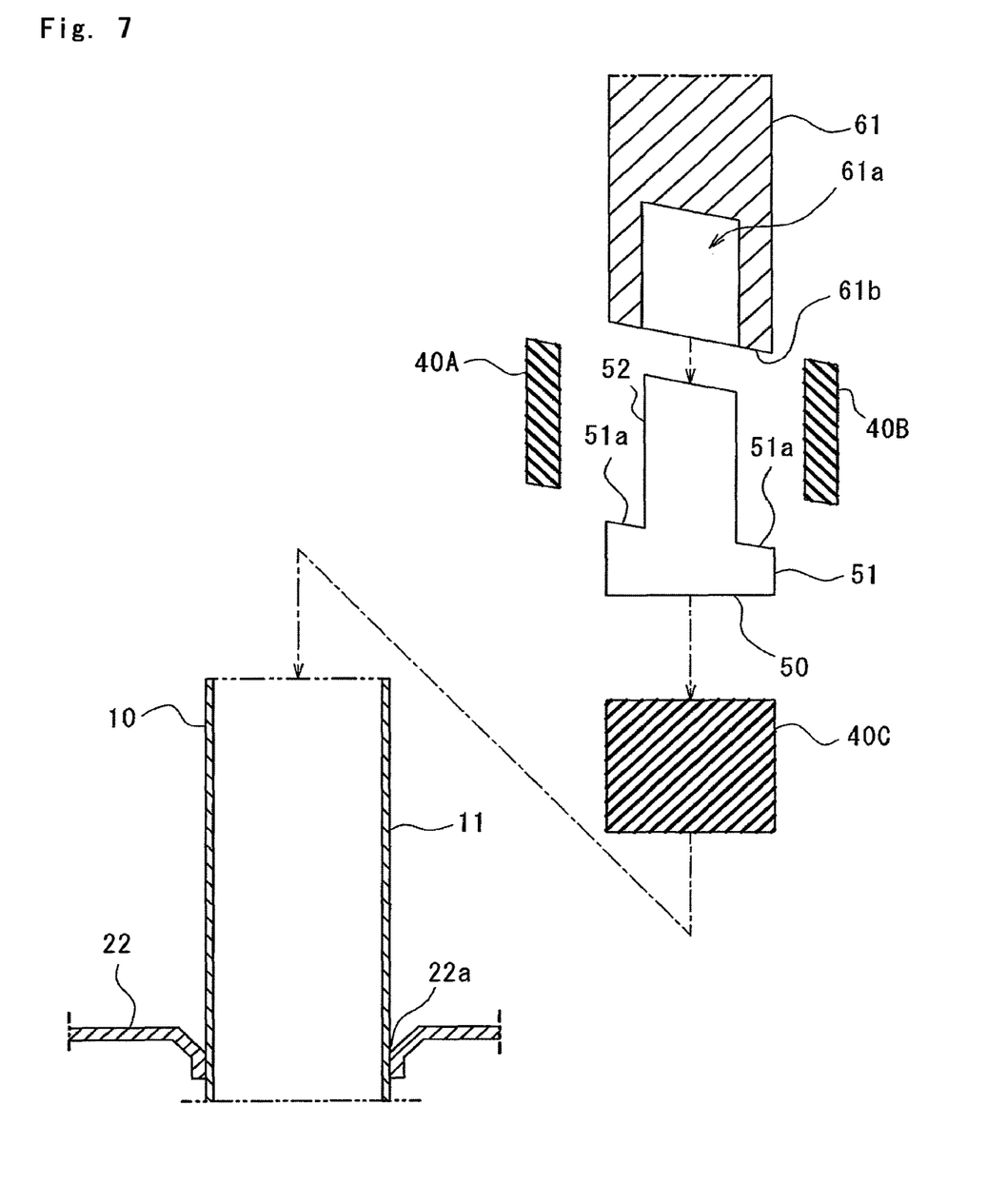
FIG. 7 is a cross-sectional view showing a second step of the bead forming method with joining by press-fitting.

With reference to FIG. 7, in the second step, the bumper stay 10 is inserted into the hole 22a in the rear wall 22 of the bumper beam 20.

Figure 8:
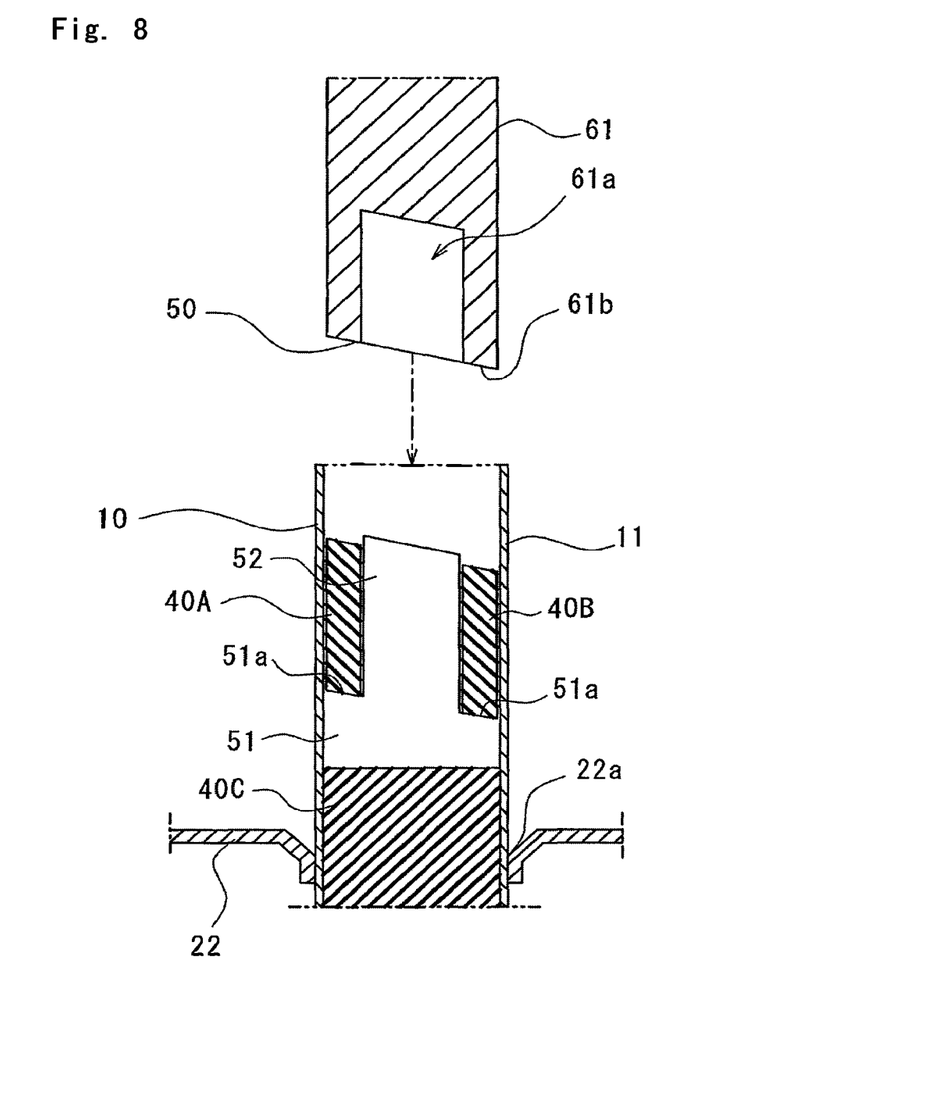
FIG. 8 is a cross-sectional view showing a third step of the bead forming method with joining by press-fitting.

With reference to FIG. 8, in the third step, the elastic body 40 and the core 50 are inserted inside the bumper stay 10. Instead of this, the elastic body 40 and the core 50 inserted inside the bumper stay 10 may be inserted into the hole 22a. That is, the order of the second step and the third step may be reversed.

The elastic body 40C is arranged at the same position as the rear wall 22 of the bumper beam 20 in the longitudinal direction of the bumper stay 10. Further, when viewed from the direction in which the bumper stay 10 extends, the elastic body 40C has substantially the same shape as shapes of the rooms R1 and R3 (see FIG. 4) of the bumper stay 10. That is, the elastic body 40C is filled in the rooms R1 and R3 (see FIG. 4) of the bumper stay 10 with almost no gap. Further, the elastic bodies 40A and 40B are placed on the receiving surface 51a of the core 50. As shown in FIG. 4, the elastic bodies 40A and 40B are arranged at both ends of the bumper stay 10 in the car width direction CW so as to sandwich the columnar portion 52 of the core 50 in each of the rooms R1 and R3.

Figure 9:
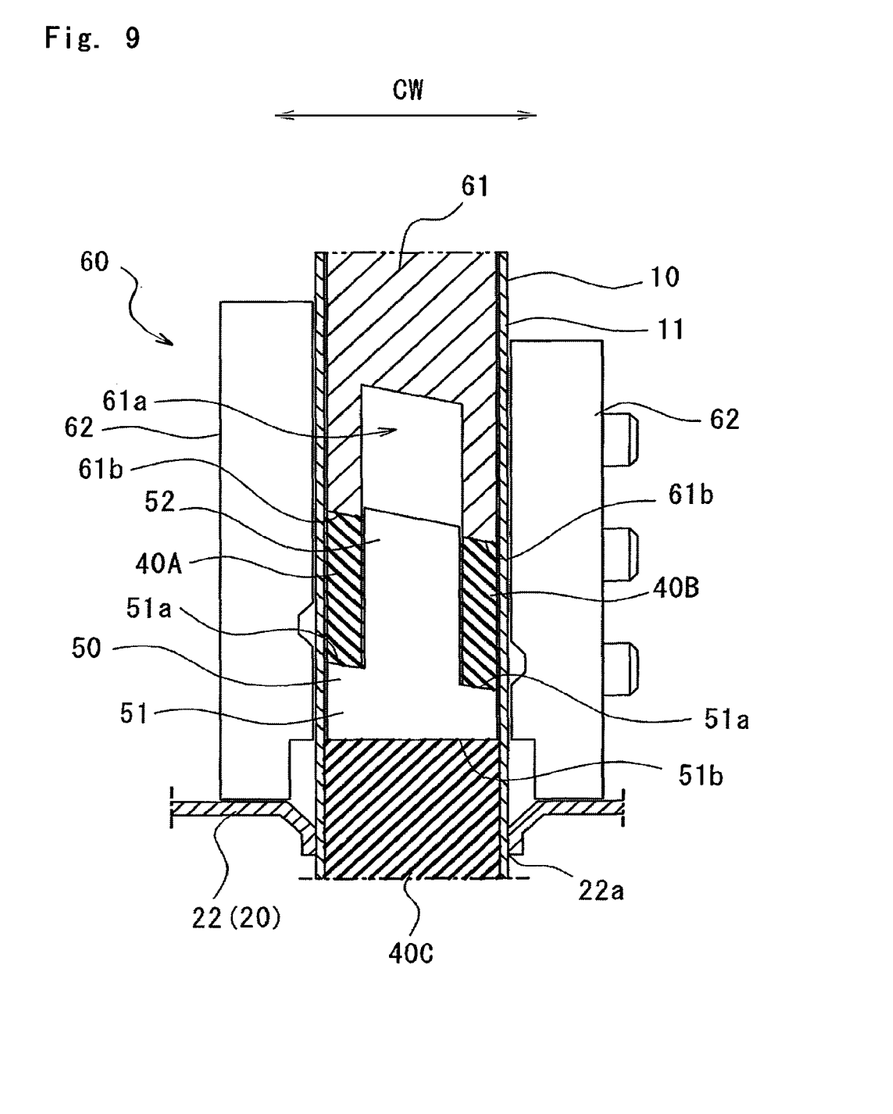
FIG. 9 is a cross-sectional view showing a fourth step of the bead forming method with joining by press-fitting.

With reference to FIG. 9, in the fourth step, the bumper stay 10, the bumper beam 20, and the elastic body 40 are assembled and set in a pressurizing device 60. The pressurizing device 60 in the present embodiment is a press machine. Alternatively, the pressurizing device 60 may be a hydraulic cylinder or the like. The pressurizing device 60 includes the pusher 61 and an outer frame mold 62.

The pusher 61 has a shape corresponding to the core 50. Specifically, the pusher 61 has a recess 61a at the tip, which is complementary to the columnar portion 52 of the core 50. Therefore, the pusher 61 can compress only the elastic body 40 without interfering with the core 50. Further, the pressing surface 61b, which is a tip surface of the pusher 61, and the receiving surface 51a of the pedestal portion 51 are formed in parallel. In the illustrated example, the pressing surface 61b and the receiving surface 51a are slightly inclined from a plane perpendicular to the longitudinal direction of the bumper stay 10, but this angle of inclination corresponds to a bending angle of an arch of the bumper beam 20.

The outer frame mold 62 is a jig that regulates deformation of the bumper stay 10. In the present embodiment, the outer frame mold 62 regulates deformation of a part other than a predetermined part. The predetermined part refers to a part where the buckling bead 11a is formed and a part where the pipe is expanded and deformed for joining by press-fitting.

Figure 10:
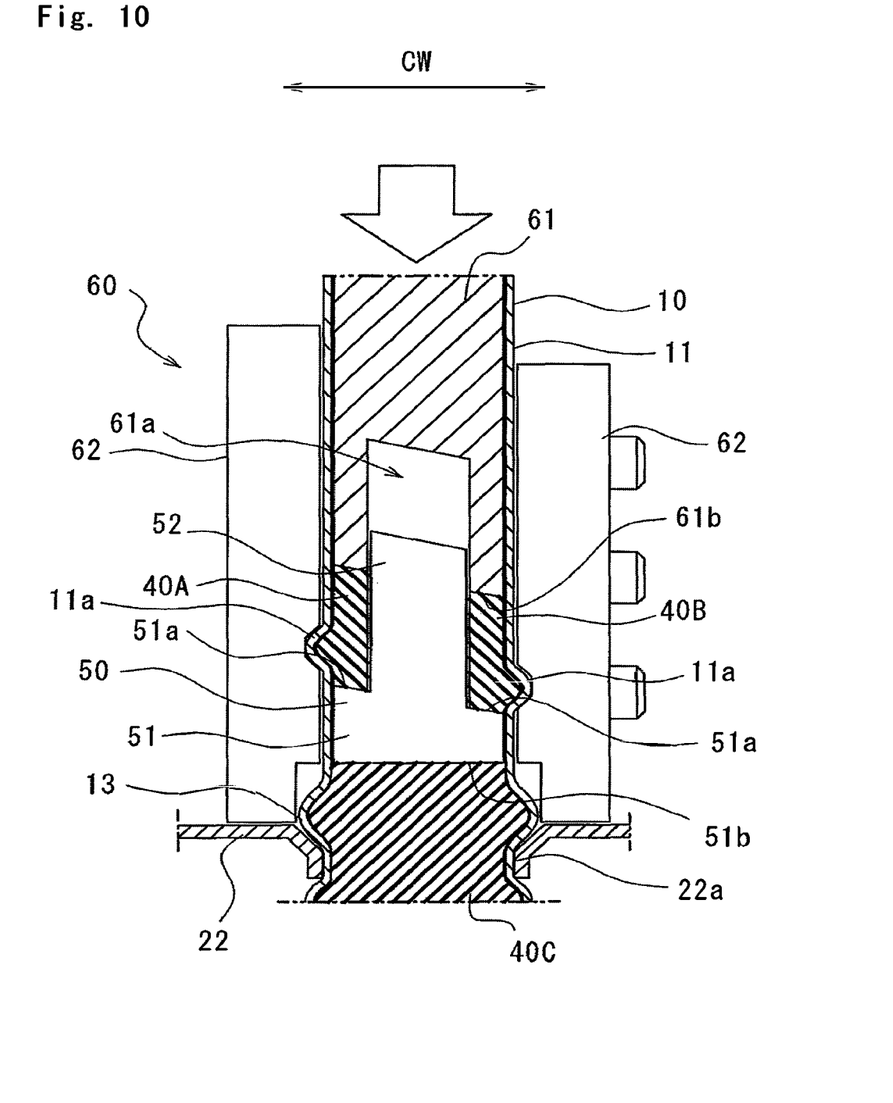
FIG. 10 is a cross-sectional view showing a fifth step of the bead forming method with joining by press-fitting.

With reference to FIG. 10, in the fifth step, the elastic body 40 is compressed in the longitudinal direction of the bumper stay 10 by the pressurizing device 60 (see the arrow in the figure). Although not shown, another pusher or fixed pedestal is arranged on a side opposite to the pusher 61 (a lower side in the figure) in the longitudinal direction of the bumper stay 10. Therefore, the pressing surface 61b of the pusher 61 and the receiving surface 51a of the core 50 can compress the elastic bodies 40A and 40B in the longitudinal direction, and also a surface opposite to the receiving surface 51a of the pedestal portion 51 of the core 50 becomes a pressing surface 51b to similarly compress the elastic body 40C in the longitudinal direction. The elastic body 40 expands in the radial direction as it is compressed in the longitudinal direction. Therefore, the bumper stay 10 receives a radially-outward force from the elastic body 40, and bulges outward in the radial direction at a part where deformation is not regulated by the outer frame mold 62. Therefore, a part of the inner and outer sides of the outer wall of the bumper stay 10 in the car width direction CW bulges to form the buckling bead 11a. At the same time, the entire circumference of the outer wall 11 bulges at a portion inserted into the hole 22a (inserted portion 13) to join the bumper stay 10 and the hole 22a by press-fitting. That is, joining by press-fitting is realized at the same time as the formation of the buckling bead 11a.

In the present embodiment, the buckling bead 11a is formed on the inner and outer sides of the outer wall 11 of the bumper stay 10 in the car width direction CW. The buckling bead 11a formed on the inner side of the outer wall 11 in the car width direction CW is arranged on the vehicle front side (rear wall 22 side) further from the buckling bead 11a formed on the outer side of the outer wall 11. The front and back relation is set according to a degree of bending of the arch of the bumper beam 20. As a result, a direction of the force applied from the bumper beam 20 to the bumper stay 10 at the time of front collision corresponds to the arrangement of the buckling bead 11a, and therefore the crushing characteristics can be suitably controlled.

Figure 11:
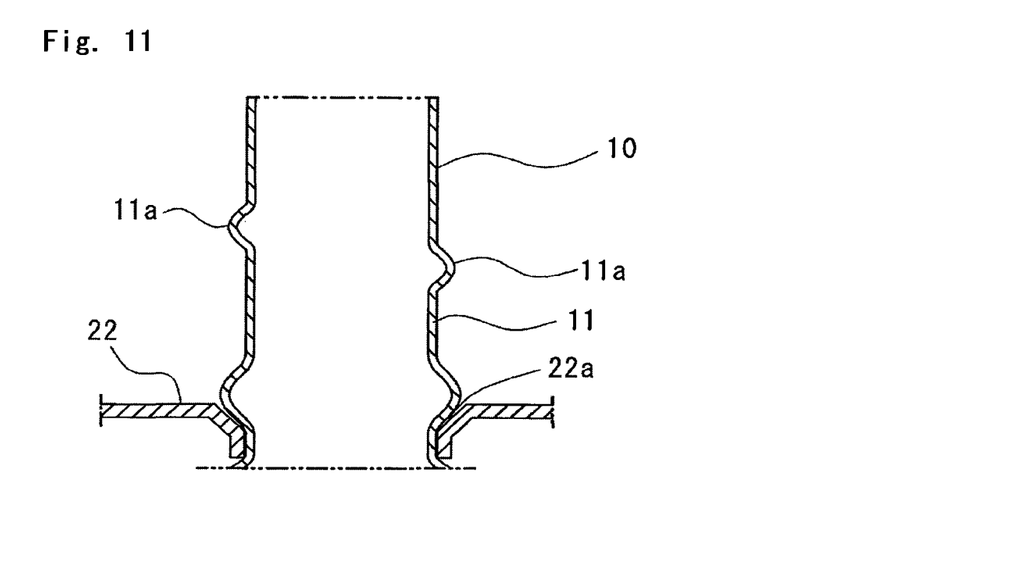
FIG. 11 is a cross-sectional view showing a sixth step of the bead forming method with joining by press-fitting.

With reference to FIG. 11, in the sixth step, after the formation of the buckling bead 11a and the joining by press-fitting are completed, the bumper stay 10 is removed from the pressurizing device 60. When a compressive force of the pressurizing device 60 is removed, the elastic body 40 restores its original shape by its own elastic force. Therefore, the elastic body 40 and the core 50 can be easily removed from the bumper stay 10.

According to the present embodiment, since the pusher 61 has the shape corresponding to the core 50, the pusher 61 can accurately press only the elastic body, even when the pusher 61 and the core 50 are used at the same time.

Further, the core 50 can be used not only as a protective member for the partition wall 12 but also as a member for pressing the elastic body 40.

Further, at the same time as forming the buckling bead 11a on the bumper stay 10, the bumper stay 10 and the bumper beam 20 can be joined by press-fitting. Therefore, it is not necessary to separate the step of forming the buckling bead 11a and the step of joining by press-fitting. Thus, the manufacturing time and the manufacturing cost can be reduced.

Further, structural members that require special crushing characteristics in a vehicle, such as bumper stay 10 and a front side member, can be easily manufactured. In particular, these members are required to serve as collision energy absorbing members at the time of front collision of a vehicle, and the crushing characteristics are required to be accurately adjusted. Therefore, the method of the present embodiment capable of forming the buckling bead at a desired position is effective for these structural members.

In particular, in the bumper stay 10 formed in this way, since the partition wall 12 is flat, the bumper stay 10 is reinforced by the partition wall 12, and the load capacity can be secured. Further, since the buckling bead 11a is formed on a part of the outer wall 11, the strength of only the part where the buckling bead 11a is formed is reduced, and the crushing direction can be defined. Therefore, the bumper stay 10 as a structural member of a vehicle can have desired crushing characteristics with adjusted load capacity and crushing direction.

Although the specific embodiments of the present invention have been described above, the present invention is not limited to the above embodiments, and various modifications can be made within the scope of the present invention.

Figure 12:
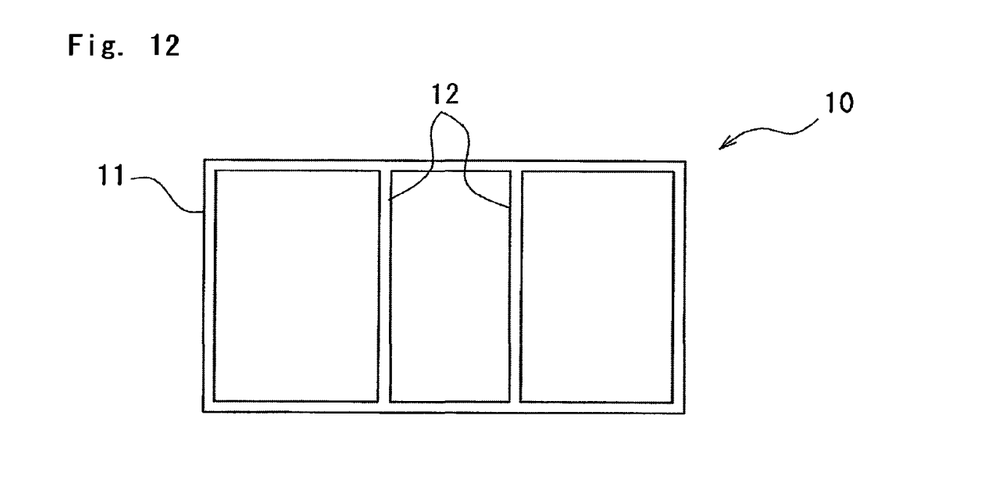
FIG. 12 is a cross-sectional view showing a first modification of the bumper stay.
Figure 13:
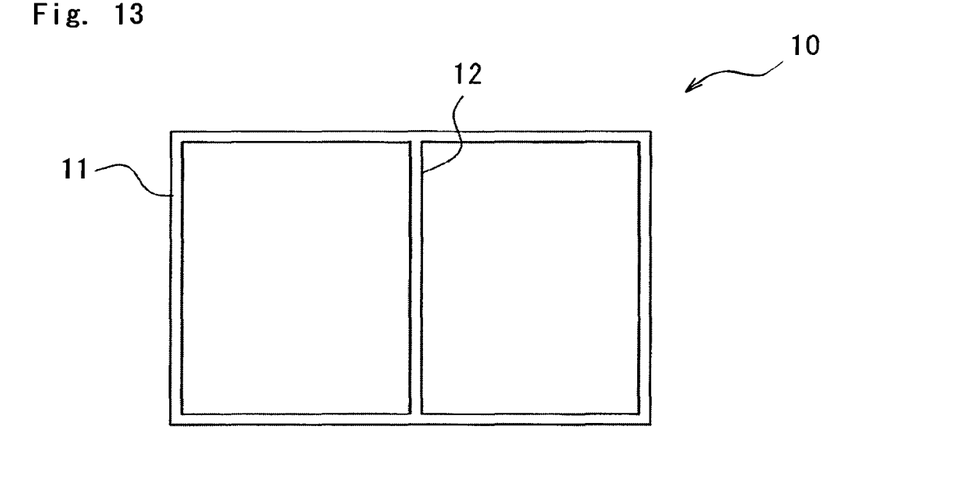
FIG. 13 is a cross-sectional view showing a second modification of the bumper stay.
Figure 14:
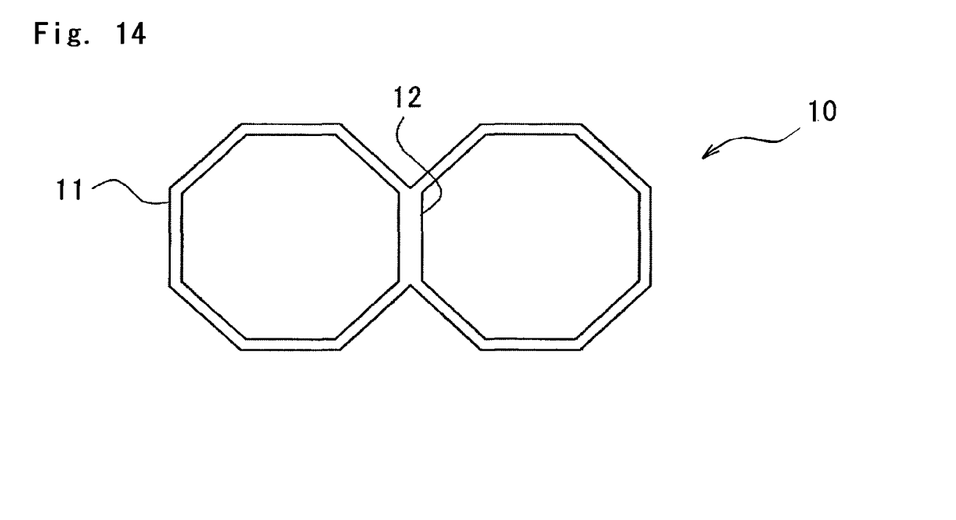
FIG. 14 is a cross-sectional view showing a third modification of the bumper stay.

For example, the cross-sectional shape of the bumper stay 10 is not limited to the so-called spectacle shape as in the above embodiment. With reference to FIGS. 12 and 13, the bumper stay 10 may have a rectangular outer shape formed by two opposing outer walls 11, and one or two partition walls 12 that face each other in the rectangular outer shape connect the outer walls 11. Further, the bumper stay 10 may have a shape in which two regular octagons are connected by sharing one side.

The invention claimed is:

1. A bead forming method comprising:
accessing a pipe body having outer walls and partition walls, the partition walls being arranged in parallel within the outer wall such that the partition wall divides an internal space of the pipe body into three rooms, the three rooms including a first outer room and a second outer room having a same shape and a central room that is smaller than the first and second outer rooms;
accessing elastic bodies that can be inserted into the pipe body and a pusher that presses the elastic bodies;
inserting a first pair of the elastic bodies into the first outer room of the pipe body and arranging the first pair of the elastic bodies in the first outer room of the pipe body so as not to come into contact with the partition walls;
inserting a second pair of the elastic bodies into the second outer room of the pipe body and arranging the second pair of the elastic bodies in the second outer room of the pipe body so as not to come into contact with the partition walls; and
forming a buckling bead in each of the first and second outer rooms by compressing the first and second pair of elastic bodies in a longitudinal direction of the pipe body by the pusher to expand the elastic bodies outward in a radial direction without coming into contact with the partition walls, so as to bulge a part of the outer walls of the pipe body outward in the radial direction without deforming the partition walls.

2. The bead forming method according to claim 1, wherein
the pipe body includes two opposing sets of the outer walls, and
the internal space of the pipe body is partitioned into the three rooms by connecting the opposing outer walls with two of the partition walls.

3. The bead forming method according to claim 2, further comprising accessing a core that protects the partition walls, wherein
the core is inserted into the pipe body together with each of the first and second pair of elastic bodies, and the core is interposed between each of the first and second pair of elastic bodies and the partition walls so that each of the first and second pair of elastic bodies do not come into contact with the partition walls.

4. The bead forming method according to claim 3, wherein
the pusher has a shape corresponding to the core, and
the pusher compresses only the first and second pair of elastic bodies without interfering with the core.

5. The bead forming method according to claim 4, wherein
the core includes a pedestal portion having a receiving surface shaped to be contacted by a pressing surface of the pusher, and a columnar portion rising from the pedestal portion,
the columnar portion is arranged in the pipe body adjacent to the partition walls,
each of the first and second pair of elastic bodies is arranged between the receiving surface of the pedestal portion and the pressing surface of the pusher in the pipe body, and
the columnar portion protects the partition walls, and the pedestal portion and the pusher compress the elastic body.

6. The bead forming method according to claim 2, further comprising accessing a wall surface body with a hole through which the pipe body can be inserted, wherein
the pipe body is inserted into the hole in the wall surface body, and
a portion of the pipe body inserted into the wall surface body is expanded to join the pipe body and the wall surface body by press-fitting at the same time as the buckling bead is formed.

7. The bead forming method according to claim 2, wherein the pipe body is a front side member or a bumper stay in a vehicle structural member.

8. The bead forming method according to claim 1, further comprising accessing a core that protects the partition walls, wherein
the core is inserted into the pipe body together with each of the first and second pair of elastic bodies, and the core is interposed between each of the first and second pair of elastic bodies and the partition walls so that each of the first and second pair of elastic bodies do not come into contact with the partition walls.

9. The bead forming method according to claim 8, wherein
the pusher has a shape corresponding to the core, and
the pusher compresses only the first and second pair of elastic bodies without interfering with the core.

10. The bead forming method according to claim 9, wherein
the core includes a pedestal portion having a receiving surface shaped to be contacted by a pressing surface of the pusher, and a columnar portion rising from the pedestal portion,
the columnar portion is arranged in the pipe body adjacent to the partition walls, each of the first and second pair of elastic bodies is arranged between the receiving surface of the pedestal portion and the pressing surface of the pusher in the pipe body, and the columnar portion protects the partition walls, and the pedestal portion and the pusher compress the elastic body.

11. The bead forming method according to claim 1, further comprising accessing a wall surface body with a hole through which the pipe body can be inserted, wherein the pipe body is inserted into the hole in the wall surface body, and a portion of the pipe body inserted into the wall surface body is expanded to join the pipe body and the wall surface body by press-fitting at the same time as the buckling bead is formed.

12. The bead forming method according to claim 1, wherein the pipe body is a front side member or a bumper stay in a vehicle structural member.

* * * * *